United States Patent
Bonicel et al.

(10) Patent No.: US 10,598,879 B2
(45) Date of Patent: *Mar. 24, 2020

(54) OPTICAL CABLE WITH RETRACTABLE MODULES AND A METHOD FOR PRODUCING SAID MODULES

(71) Applicant: Draka Comteq B.V., Amsterdam (NL)

(72) Inventors: Jean-Pierre Bonicel, Paron (FR); Oliver Tatat, Paron (FR); Alain Lavenne, Paron (FI); Jan Hennink, Delft (NL); Arnoldus Gertrudis Wilhelmus Berkers, Delft (NL); Jan Wigger Jonker, Delft (NL)

(73) Assignee: Draka Comteq B.V., Amsterdam (NL)

( * ) Notice: Subject to any disclaimer, the term of this patent is extended or adjusted under 35 U.S.C. 154(b) by 0 days.
This patent is subject to a terminal disclaimer.

(21) Appl. No.: 16/527,590

(22) Filed: Jul. 31, 2019

(65) Prior Publication Data
US 2019/0353858 A1    Nov. 21, 2019

Related U.S. Application Data

(63) Continuation of application No. 15/513,624, filed as application No. PCT/IB2014/002207 on Sep. 25, 2014, now Pat. No. 10,393,975.

(51) Int. Cl.
*G02B 6/44*    (2006.01)

(52) U.S. Cl.
CPC .............. *G02B 6/441* (2013.01); *G02B 6/443* (2013.01); *G02B 6/4483* (2013.01)

(58) Field of Classification Search
CPC ....... G02B 6/441; G02B 6/443; G02B 6/4483
See application file for complete search history.

(56) References Cited

U.S. PATENT DOCUMENTS

| 5,740,295 A | * | 4/1998 | Kinard | G02B 6/441 385/103 |
| 6,035,087 A | * | 3/2000 | Bonicel | G02B 6/441 385/109 |

(Continued)

FOREIGN PATENT DOCUMENTS

| EP | 2312359 A1 | 4/2011 |
| EP | 2584390 A1 | 4/2013 |

(Continued)

OTHER PUBLICATIONS

International Search Report in counterpart International Application No. PCT/IB2014/002207 dated May 21, 2015, pp. 1-3.

(Continued)

*Primary Examiner* — Chris H Chu
(74) *Attorney, Agent, or Firm* — Additon, Higgins & Pendleton, P.A.

(57) ABSTRACT

An exemplary optical cable comprises a sheath surrounding a cavity and a plurality of modules arranged within the cavity with a filling ratio between 20 and 50%. Exemplary modules include four to twelve optical fibers and a tube surrounding the optical fibers. An exemplary tube has a layered structure including an inner layer of polycarbonate and an outer layer of low friction polymer, such as polyamide and/or fluorinated polymer. An exemplary tube has a ratio between its inner diameter (di) and its outer diameter ($d_o$) between 0.45 and 0.55, and its outer layer has a thickness between 0.05 and 0.15 mm. The filling ratio of the module is typically 55% or greater.

20 Claims, 2 Drawing Sheets

(56) References Cited

U.S. PATENT DOCUMENTS

| | | | |
|---|---|---|---|
| 6,487,347 B2* | 11/2002 | Bringuier | G02B 6/441 |
| | | | 385/113 |
| 6,671,441 B1* | 12/2003 | Bocanegra | G02B 6/443 |
| | | | 385/112 |
| 10,061,096 B2* | 8/2018 | Takeda | G02B 6/4433 |
| 2002/0041743 A1* | 4/2002 | Schneider | G02B 6/4419 |
| | | | 385/101 |
| 2005/0031277 A1 | 2/2005 | Japon | |
| 2005/0265673 A1 | 12/2005 | Mumm et al. | |
| 2009/0017247 A1* | 1/2009 | Bellet | B32B 1/08 |
| | | | 428/36.91 |
| 2009/0087153 A1* | 4/2009 | Weiss | G02B 6/4438 |
| | | | 385/113 |
| 2011/0069932 A1* | 3/2011 | Overton | C03C 25/106 |
| | | | 385/100 |
| 2015/0370023 A1* | 12/2015 | Baca | G02B 6/441 |
| | | | 385/110 |
| 2016/0041354 A1* | 2/2016 | Guenter | G02B 6/4432 |
| | | | 385/86 |
| 2017/0248765 A1 | 8/2017 | Bonicel et al. | |

FOREIGN PATENT DOCUMENTS

| | | |
|---|---|---|
| FR | 2914752 A1 | 10/2008 |
| KR | 2013-0120963 A | 11/2013 |
| WO | 2004/081611 A2 | 9/2004 |
| WO | 2006/136558 A1 | 12/2006 |
| WO | 2007/091880 A1 | 8/2007 |
| WO | 2016/046586 A1 | 3/2016 |

OTHER PUBLICATIONS

International Written Opinion in counterpart International Application No. PCT/IB2014/002207 dated May 21, 2015, pp. 1-7.

International Preliminary Report on Patentability in counterpart International Application No. PCT/IB2014/002207 dated Mar. 28, 2017, pp. 1-8.

Machine Translation of French Publication No. 2914752 pp. 1-8.

Office Action in counterpart European Application No. 14830539.4 dated Nov. 19, 2018, pp. 1-4.

* cited by examiner

OPTICAL CABLE WITH RETRACTABLE MODULES AND A METHOD FOR PRODUCING SAID MODULES

1. CROSS-REFERENCE TO PRIORITY APPLICATIONS

This application is a continuation of U.S. patent application Ser. No. 15/513,624 for An Optical Cable with Retractable Modules and a Method for Producing Said Modules, filed Mar. 23, 2017, (and published Aug. 31, 2017, as U.S. Publication No. 2017/0248765 A1), which itself is the U.S. national-stage application of International Patent Application No. PCT/IB2014/002207 for An Optical Cable with Retractable Modules and a Method for Producing Said Modules, filed Sep. 25, 2014, (and published Mar. 31, 2016, as International Publication No. WO 2016/046586 A1). Each of the foregoing patent applications and patent application publications is hereby incorporated by reference in its entirety.

2. TECHNICAL FIELD

The present invention relates generally to the field of optical waveguide structure of the optical fiber type.

3. BACKGROUND ART

Optical fibers are used to transmit information over long distances at the speed of light in glass. In order to achieve successfully this mission, optical fibers and the corresponding optical waveguide structures must be able to resist the potential alterations that may occur during the operational period of the fibers.

Moreover, deployment of optical fibers has shown a tremendous increase in the context of FTTx business (such as Fiber To The Home (FTTH), Fiber To The Curb (FTTC), . . . ). In this context, a specialty cable, filled with loose fiber modules that are designed to have low friction properties, is used as the core of the operation. Window-cuts can be made at multiple points along the cable length, so as to allow individual fiber modules to be cut and pulled back to one of those earlier window-cuts. These fiber modules can then be pushed or blown though separate micro-ducts to reach a termination or distribution point (typically on the customer premises).

It is important that such fiber modules have the flexibility to be pushed, pulled, bent, branched, and handled in ways that allow easy manipulation for installation, without reductions in loss or damage to the fiber core.

Patent document WO 2006/136558 discloses an optical fiber cable comprising: a protective sheath having an inner surface defining a cavity, one or more micro-cables or micro-tubes running inside the cavity, each micro-cable having an outer jacket, characterized in that the cross-sectional area of the micro-cables and micro-tubes is less than 75% of the cross-sectional area of the cavity, and in that the outer jacket of a micro-cable or a micro-tube is formed of a material having a dynamic coefficient of friction that, when measured according to test A, is less than or equal to 0.2 and having a Shore hardness greater than 65. This patent document describes parallel modules made of a mixture of polycarbonate and polybutylene terephthalate in a cable, each module containing one, two, or four optical fibers. The external diameter of these modules is 1.4 mm.

Patent document FR 2 914 752 discloses a cable that has a longitudinal central cavity receiving a set of optical fiber micro modules arranged in a parallel manner, and a sheath surrounding the central cavity. A protection armor, e.g., steel strap, is arranged on an inner periphery of the sheath, and each micro module includes a maintaining sheath of an optical fiber surrounded by an external layer having friction coefficient higher than that of the maintaining sheath. It also discloses a method for extracting a micro module of an optical fiber telecommunication cable. This patent document describes parallel modules in a cable, each micro module containing 4 to 24 optical fibers. The external layer of the micro modules could be polyamide.

Patent document US2005/0265673 discloses a communication cable buffer tube having a flexural modulus ranging from about $1.24*10^6$ to $1.93*10^6$ kPa (180 to 280 kpsi). Buffer tubes made of e.g., polycarbonate, polyamide (such as nylon 12), and combinations thereof are also disclosed.

The Applicant of the present patent application, a subsidiary of Prysmian Group, operates an optical cable referenced as RETRACTANET that comprises retractable fiber modules called PICOFLEX in which optical fiber bundles are embedded in a special soft hot melt. A layer of technical polymer such as polyamide is then extruded on the special hot melt layer. These modules own specific technical attributes regarding their thermal stability, low friction coefficient, tensile strength, and strip ability, allowing the optical cable to be operational.

These modules are soft enough to be flexible and easy to handle, while at the same time being stiff enough to retract long distances within the cable and be pushed or blown through small micro-ducts as well.

However, there is a need for improving such an optical cable, in order for an operator to access more quickly the optical fibers within the modules and to extract quickly and on a long distance said fibers from the cable.

More generally, it would be desirable to improve the fiber access of fibers contained in retractable modules, while keeping sufficient strength of the module to withstand the pulling forces during module extraction from the cable.

4. SUMMARY

In one particular embodiment of the invention, an optical cable is disclosed, which comprises a sheath having an inner surface defining a cavity and a plurality of modules arranged into said cavity and targeted to be parallel, said cavity having a filling ratio between 20% and 50%. Said modules comprise:
  four to twelve fibers,
  a tube surrounding the fibers and made from a mix of polycarbonate (PC) and a low friction polymer, chosen from the group of fluorinated polymers and polyamide; said tube having a ratio between its inner and outer diameters between 0.45 and 0.55, and comprising an outer low friction polymer layer having a thickness between 0.05 mm and 0.15 mm, and
  a filling ratio of said module greater than 55%.

In the following description, the expression "substantially parallel modules" or "modules targeted to be parallel" refers to modules that are non-(helical or SZ-)stranded or, in other words, to modules that are not wound into a common strand. The "filling ratio of the cavity" is the total cross section of the optical modules divided by the cross section of the cable cavity, given in %. The filling ratio of the cavity is:

$$100*N*(d_e/D)^2$$

With $d_o$ the outer diameter of an optical module, N the number of modules in the cable, and D the inner diameter of the cable.

By analogy, the filling ratio of the module is:

$$100 * N_f * (d_f/d_i)^2$$

With $N_f$ the number of fibers in the module, $d_f$ the outer diameter of said fibers, and $d_i$ the inner diameter of the module. Since the tube is the surrounding envelope of the module, the inner diameter of the tube is also the inner diameter of the module, and the outer diameter of the tube is also the outer diameter of the module.

In order to achieve good retractability over long lengths, the filling ratio of the cable according to the invention is restrained between 20 and 50%.

In addition, the control of the module-filling ratio above 55% allows improving the kink and tensile properties of the module.

According to the invention, modules are totally free in the cable. Hence, fibers in these modules present excellent performance in attenuation and thermal stability, meeting most of the international standards.

The present invention also relies on a novel and inventive approach of both the composition and the conformation of the modules and induces several advantages and benefits.

First of all, the use of a mix of PC and a low friction polymer in the composition of the tube allows maintaining a satisfactory thermal stability within the module. Such a limitation of the thermal variations allows limiting the attenuation of the light signal carried by the optical fibers, improving as a consequence the efficiency of the optical cable. Such a low friction polymer is chosen from the group of fluorinated polymers and polyamide.

The covering of the PC by a thin layer of low friction polymer, such as PA for example, allows on a firsthand to reduce the friction coefficient of the module. Thus, the low friction coefficient allows the pull back of the modules up to 200 m in the cable. On the other hand, the outer layer also protects the PC layer that is highly sensitive to the stress cracking. The outer layer therefore avoids the PC layer being in direct contact with tension active materials such as solvents, which are able to alter its structure. Advantageously, the outer layer is watertight, which significantly reduces the module preparation time for splicing the fibers. In order to obtain the desired effect from the mix of low friction polymer and PC, the thickness of the outer layer is ranging from 0.05 to 0.15 mm. Indeed, an outer layer thickness above 0.05 mm allows for a good protection of the PC layer, while above a thickness of 0.15 mm, the share of PC is too low to be a satisfactory base material.

In other words, modules according to embodiments of the invention present a very low friction coefficient of 0.15 maximum and a tensile strength that allows applying on the module a pulling force during a pullback operation without breaking of the optical fiber.

A module according to embodiments of the invention presents a low sensitivity to the kink effect. This parameter is very important to be able to execute in the right way the pullback operations, and all further splicing operations. Since the increase of the ratio between the inner and outer diameters of the module is linked to the increase of the kink effect sensitivity, this ratio is carefully controlled between 45 and 55% in order to keep the kink performances of the module optimal while leaving the necessary space within the module so that it can contains from four to twelve fibers.

Embodiments of the invention also contribute to improve the production phase of the module. The process is then characterized by a better control of module diameter and by a reduction of the occurrence of fiber breaks, lumps, and scrap production, which allows to reduce the production costs. In addition, an extrusion speed of 300 m per minute can advantageously be reached.

Finally, the module according to embodiments of the invention allows an easy access to the fibers by the operator of the optical cable. In this matter, a simple ring cut at 1.5 m from the end of the module allows in one subsequent step and in a limited amount of time (a few seconds) extracting the fibers from the cable.

In one particular embodiment, the module comprises four or eight or twelve fibers.

The increase in the number of fibers $N_f$ allows to comply with the minimum threshold of 55% defined for the filling ratio of the module as mentioned before.

Of course, notably for 4-fiber modules, some of the fibers may be dummy fibers, or non-functioning fibers, if less than four optical fibers are required. Such dummy fibers (which could be out of spec fibers) are required for the mechanical stability of the 4-fiber module.

The operator is therefore free to implement one to four optical fibers for each tube while keeping a satisfactory filling ratio in the 4-fiber module by the implementation of non-functioning (dummy) fibers.

According to an embodiment of the invention, for fibers having a diameter of 245 µm ±10 µm, the outer diameter ($d_o$) of said modules is between 1.20 and 1.45 mm for a 4-fiber module, or between 1.55 and 1.9 mm for an 8-fiber module, or between 1.90 and 2.50 mm for a 12-fiber module.

According to another embodiment of the invention, for fibers having a diameter of 200 µm±10 µm, the outer diameter ($d_o$) of said modules is between 1.00 and 1.20 mm for a 4-fiber module, or between 1.25 and 1.55 mm for an 8-fiber module, or between 1.55 and 1.90 mm for a 12-fiber module.

According to an aspect of the invention, said tube is a coextruded polycarbonate and polyamide tube. Such a co-extrusion process allows for improved adhesion between PC and PA layers, as compared to two separate extrusion steps.

According to yet another aspect, the tube surrounding the fibers is filled with a filling compound having a viscosity between 5000 and 7000 mPa·s at 25° C. Hence, the fibers are not bonded to the tube. This technical feature advantageously eases the process of the pullback operations.

In one particular embodiment, the filling compound is replaced with a swellable material, i.e., with a material having the ability to increase volume by absorption of solvent. This technical feature eases the fiber cleaning and reduces the preparation time for splicing the fibers.

According to another aspect, the module is watertight and totally dry.

This technical feature allows further reducing the module preparation time for splicing the fibers.

In one particular embodiment, at least one of said modules comprises four fibers and has an inner diameter of 0.65 mm and an outer diameter of 1.25 mm.

According to another aspect, the thickness of the outer layer is preferably 0.1 mm.

According to another aspect yet, the PA is a PA12-type polyamide.

According to yet another aspect, for at least one of said modules, said tube comprises four fibers and an inner polycarbonate layer having an inner diameter of 0.65 mm and outer diameter of 1.05 mm and an outer polyamide layer having an inner diameter of 1.05 mm and an outer diameter of 1.25 mm.

The selection of values and/or material for the inner and outer diameters of the module, the thickness of the PA layer and/or the composition of the PA, as described here above, allows obtaining an optical cable that features optimal technical performances in operation.

In one particular embodiment, at least two of said modules have outer layers with different colors.

Such a change of colors of the low friction polymer skin eases the identification of the different modules within the cable.

The invention also concerns a method for manufacturing an optical cable as described here above, which comprises a step of co-extrusion of the tube from a mix of low friction polymer, chosen from the group of fluorinated polymers and polyamide, and PC.

This method allows improving the adhesion between the low friction polymer, such as PA, and PC layers, compared to a method comprising two separate extrusion steps. Said step of co-extrusion of the tube may be driven at a speed of at least 150 m/min, preferably at least 300 m/min, more preferably at least 450 m/min.

While not explicitly described, the present embodiments may be employed in any combination or sub-combination.

5. BRIEF DESCRIPTION OF THE DRAWINGS

The invention can be better understood with reference to the following description and drawings, given by way of example and not limiting the scope of protection, and in which.

The components in the figures are not necessarily to scale, emphasis instead being placed upon illustrating the principles of the invention.

6. DESCRIPTION OF AN EMBODIMENT

The present invention relates to optical cables, modules, and fibers. Many specific details of the invention are set forth in the following description and in FIGS. 1 and 2. One skilled in the art, however, will understand that the present invention may have additional embodiments, or that the present invention may be practiced without several of the details described in the following description.

The foregoing is described in relation to a particular embodiment of the invention, in which modules comprise four fibers. It must be understood that modules according to the invention may also comprise eight or twelve fibers, although this is not described in the following exemplary embodiment.

Moreover, the following exemplary embodiment describes a co-extruded tube made from a mix of PC and PA. It must be understood that any other low friction polymer may replace polyamide, notably a polymer chosen from the group of fluorinated polymers.

Figure 1:
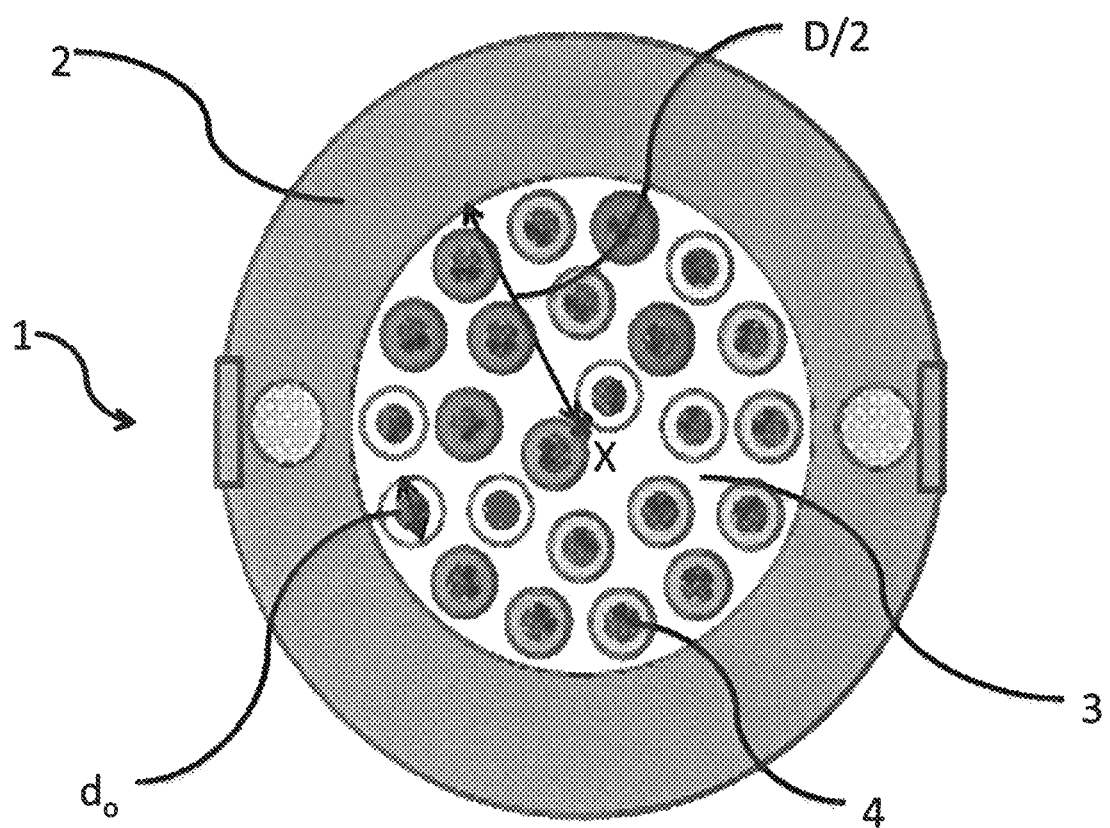
FIG. 1 is a schematic view of the cross section of a cable according to an embodiment of the invention.

FIG. 1 illustrates schematically an optical cable 1. Cable 1 is defined about an axis of revolution X that is orthogonal to the plan of FIG. 1. Cable 1 comprises a sheath 2 that defines the outline of cable 1. This sheath 2 is a reinforced plastic tube and features a certain thickness which value is equal to the difference between its outer diameter and its inner diameter D. The sheath inner wall defines a cavity 3 in which a number N of modules 4 is arranged. Each of these modules 4 is defined about an axis of revolution Y that is substantially parallel to the axis of revolution X of cable 1. Each module 4 features an outer diameter $d_o$. According to the formula mentioned here above, the filling ratio within the cavity 3 ranges from 20 to 50%.

Figure 2:
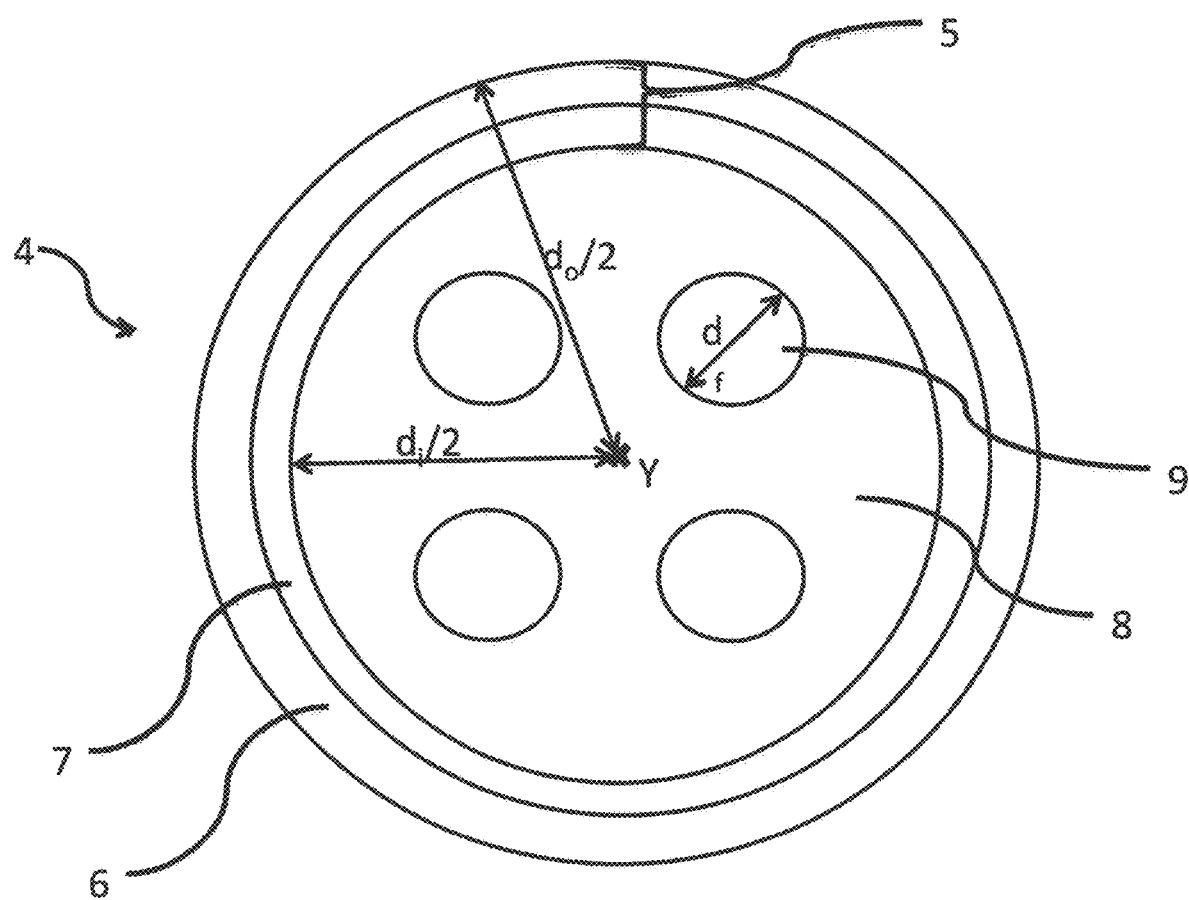
FIG. 2 is a schematic view of the cross section of a module according to an embodiment of the invention.

FIG. 2 illustrates schematically a module 4. This module 4 is defined about an axis of revolution Y that is orthogonal to the plan of FIG. 2. Module 4 comprises a tube 5 that defines its outline. The inner diameter $d_i$ of the tube 5 is 0.65 mm, whereas its outer diameter $d_o$ is 1.25 mm. Tube 5 is the result of the co-extrusion of an outer PA layer 6 and an inner PC layer 7, bonded one with the other. The respective thicknesses of the PA and PC layers are 0.1 and 0.2 mm. The tube's inner wall defines a cavity 8 in which four optical fibers 9 ($N_f$ is then equal to 4) are arranged. The rest of the cavity is filled with an optical cable filling compound 10, whose viscosity is between 5000 and 7000 mPa·s at 25° C., such as cable gels marketed under the trade name UNIGEL. Each of the optical fibers is defined about a revolutionary axis that is substantially parallel to the axis Y of module 4. Each fiber features an outer diameter $d_f$. According to embodiments of the invention and following the formula mentioned here above, the filling ratio within module 4 is above 55%.

As mentioned above, tests have been conducted in order to challenge the thermal stability of a module according to the invention. In this matter, 1 km of such module in a free coil has been operated under temperatures ranging between −30° C. to +70° C. As a result, the change in attenuation of a light signal with a wavelength of 1625 nm has been measured under 0.15 dB/km for a fiber of the known G657A2-type (BendBright$^{xs}$ FTTH optical fiber, produced by Prysmian Group). Such a minimization of the light attenuation in an optical fiber is undoubtedly a major performance that distinguishes the module according to the invention from the prior art.

The invention claimed is:

1. An optical cable, comprising a sheath having an inner surface defining a cavity and a plurality of modules arranged within said cavity, said cavity having a filling ratio between 20% and 50%, each of said modules comprising:
four to twelve optical fibers,
a tube surrounding said optical fibers and having a layered structure comprising an inner layer of polycarbonate and an outer layer of low friction polymer comprising polyamide and/or fluorinated polymer, said tube having a ratio between its inner diameter ($d_i$) and its outer diameter ($d_o$) between 0.45 and 0.55, and the outer layer having a thickness between 0.05 and 0.15 mm, and
a filling ratio of said module greater than 55%,
wherein, as measured within 1000 meters of at least one of said modules in a free coil and operated over a temperature range between −30° C. and 70° C., said optical fibers have a maximum change in light-signal attenuation of 0.15 dB/km or less at a wavelength of 1625 nanometers.

2. The cable according to claim 1, wherein, as measured within 1000 meters of each of said modules in a free coil and operated over a temperature range between −30° C. and 70° C., said optical fibers have a maximum change in light-signal attenuation of 0.15 dB/km or less at a wavelength of 1625 nanometers.

3. The cable according to claim 1, wherein each of said modules includes exactly 4 optical fibers, 8 optical fibers, or 12 optical fibers.

4. The cable according to claim 3, wherein for optical fibers having a diameter of 245 μm±10 μm, the outer diameter ($d_o$) of said modules is between 1.20 and 1.45 mm for a 4-fiber module, or between 1.55 and 1.9 mm for an 8-fiber module, or between 1.90 and 2.50 mm for a 12-fiber module.

5. The cable according to claim 3, wherein for optical fibers having a diameter of 200 μm±10 μm, the outer diameter ($d_o$) of said modules is between 1.00 and 1.20 mm for a 4-fiber module, or between 1.25 and 1.55 mm for an 8-fiber module, or between 1.55 and 1.90 mm for a 12-fiber module.

6. The cable according to claim 1, wherein said tube is a coextruded polycarbonate and polyamide tube.

7. The cable according to claim 1, wherein said tube surrounding said optical fibers is filled with a filling compound having a viscosity between 5000 and 7000 mPa·s at 25° C.

8. The cable according to claim 1, wherein said tube surrounding said optical fibers is filled with a swellable material.

9. The cable according to claim 1, wherein said low friction polymer consists essentially of PA12-type polyamide.

10. The cable according to claim 1, wherein at least one of said modules comprises four optical fibers and a multilayered tube comprising (i) an inner polycarbonate layer having an inner diameter of 0.65 mm and outer diameter of 1.05 mm and (ii) an outer polyamide layer having an inner diameter of 1.05 mm and an outer diameter of 1.25 mm.

11. A method for manufacturing an optical cable according to claim 1, comprising a step of co-extrusion of the tube from polycarbonate and low friction polymer comprising polyamide and/or fluorinated polymers.

12. The method according to claim 11, wherein said step of co-extrusion of the tube is driven at a speed of at least 150 m/min.

13. An optical cable, comprising a sheath having an inner surface defining a cavity and a plurality of substantially parallel modules arranged within said cavity, said cavity having a filling ratio between 20% and 50%,
wherein each of said modules comprises:
four to twelve optical fibers, and
a multilayer tube surrounding said optical fibers and comprising a polycarbonate inner layer and a low friction polymer outer layer comprising polyamide and/or fluorinated polymer, said multilayer tube having a ratio between its inner diameter ($d_i$) and outer diameter ($d_o$) between 0.45 and 0.55, and said low friction polymer outer layer having a thickness between 0.05 and 0.15 mm,
wherein each of said modules has a filling ratio of 55% or greater, and
wherein, as measured within 1000 meters of at least one of said modules configured in a free coil, said optical fibers have a maximum change in light-signal attenuation of less than 0.15 dB/km at a wavelength of 1625 nanometers over a temperature range between −30° C. and 70° C.

14. The cable according to claim 13, wherein, as measured within 1000 meters of each of said modules configured in a free coil, said optical fibers have a maximum change in light-signal attenuation of less than 0.15 dB/km at a wavelength of 1625 nanometers over a temperature range between −30° C. and 70° C.

15. The cable according to claim 13, wherein each of said modules comprises a multilayer tube consisting of a polycarbonate inner layer and a contiguous, low friction polyamide outer layer.

16. The cable according to claim 13, wherein for optical fibers having a diameter of 245 μm±10 μm, the outer diameter ($d_o$) of said modules is between 1.20 and 1.45 mm for a 4-fiber module, or between 1.55 and 1.9 mm for an 8-fiber module, or between 1.90 and 2.50 mm for a 12-fiber module.

17. The cable according to claim 13, wherein for optical fibers having a diameter of 200 μm±10 μm, the outer diameter ($d_o$) of said modules is between 1.00 and 1.20 mm for a 4-fiber module, or between 1.25 and 1.55 mm for an 8-fiber module, or between 1.55 and 1.90 mm for a 12-fiber module.

18. A method for manufacturing an optical cable according to claim 13, comprising a step of co-extruding the tube from (i) polycarbonate and (ii) low friction polymer comprising polyamide and/or fluorinated polymer.

19. The method according to claim 18, wherein the step of co-extruding the tube comprises co-extruding the tube at a speed of at least 300 m/min.

20. The method according to claim 18, wherein the step of co-extruding the tube comprises co-extruding the tube at a speed of at least 450 m/min.

* * * * *

UNITED STATES PATENT AND TRADEMARK OFFICE
CERTIFICATE OF CORRECTION

PATENT NO. : 10,598,879 B2
APPLICATION NO. : 16/527590
DATED : March 24, 2020
INVENTOR(S) : Bonicel et al.

Page 1 of 1

It is certified that error appears in the above-identified patent and that said Letters Patent is hereby corrected as shown below:

On the Title Page

Correct Item (72) to read: Jean-Pierre Bonicel, Paron (FR); Olivier Tatat, Paron (FR); Alain Lavenne, Paron (FR); Jan Hennink, Delft (NL); Arnoldus Gertrudis Wilhelmus Berkers, Delft (NL); Jan Wigger Jonker, Delft (NL)

Signed and Sealed this
Thirtieth Day of June, 2020

Andrei Iancu
*Director of the United States Patent and Trademark Office*